United States Patent [19]
Krahnke et al.

[11] Patent Number: 6,127,502
[45] Date of Patent: Oct. 3, 2000

[54] POLYORGANOSILOXANES HAVING AT LEAST ONE ORGANOFUNCTIONAL GROUP WITH MULTIPLE HYDROLYZABLE GROUPS

[75] Inventors: Robert Harold Krahnke, Midland; Timothy B. Lueder, Mt. Pleasant; Richard Alan Palmer; Nick Evan Shephard, both of Midland, all of Mich.

[73] Assignee: Dow Corning Corporation, Midland, Mich.

[21] Appl. No.: 09/217,477

[22] Filed: Dec. 21, 1998

[51] Int. Cl.$^7$ .................................................. C08G 27/18
[52] U.S. Cl. ............................... 528/10; 528/37; 528/31; 528/32; 528/15; 556/458; 556/464
[58] Field of Search .................................. 528/10, 37, 15, 528/31, 32; 556/458, 464

[56] References Cited

U.S. PATENT DOCUMENTS

| | | | |
|---|---|---|---|
| 3,109,013 | 10/1963 | Haluska | 260/448.2 |
| 3,122,522 | 2/1964 | Brown et al. | 260/46.5 |
| 3,151,099 | 9/1964 | Frederic et al. | 260/46.5 |
| 3,161,614 | 12/1964 | Brown et al. | 260/46.5 |
| 3,175,993 | 3/1965 | Weyenberg | 260/46.5 |
| 3,294,739 | 12/1966 | Weyenberg | 260/46.5 |
| 3,334,067 | 8/1967 | Weyenberg | 260/46.5 |
| 3,631,193 | 12/1971 | Young | 260/448.2 |
| 3,671,483 | 6/1972 | Young | 260/32.8 |
| 3,714,109 | 1/1973 | Matherly | 260/32.8 |
| 3,794,556 | 2/1974 | Young | 161/206 |
| 3,819,674 | 6/1974 | Rudolph et al. | 260/448.2 |
| 4,283,519 | 8/1981 | Pines et al. | 528/26 |
| 4,461,867 | 7/1984 | Surprenant | 524/788 |
| 4,525,400 | 6/1985 | Surprenant | 428/54 |
| 4,525,566 | 6/1985 | Homan et al. | 528/17 |
| 4,579,964 | 4/1986 | Totten et al. | 556/434 |
| 4,599,394 | 7/1986 | Lucas | 528/15 |
| 4,616,076 | 10/1986 | Ona et al. | 528/15 |
| 4,652,624 | 3/1987 | Allen et al. | 528/17 |
| 4,731,411 | 3/1988 | Lucas | 524/860 |
| 4,743,474 | 5/1988 | Homan | 427/387 |
| 4,772,675 | 9/1988 | Klosowski et al. | 528/15 |
| 4,849,491 | 7/1989 | Ogawa et al. | 528/15 |
| 4,871,827 | 10/1989 | Klosowski et al. | 528/17 |
| 4,888,404 | 12/1989 | Klowowski et al. | 528/15 |
| 4,898,910 | 2/1990 | Kamis et al. | 524/860 |
| 4,956,435 | 9/1990 | Chu et al. | 528/17 |
| 5,017,672 | 5/1991 | Krahnke et al. | 528/23 |
| 5,079,311 | 1/1992 | Colas | 525/478 |
| 5,091,484 | 2/1992 | Cola et al. | 525/477 |
| 5,097,054 | 3/1992 | Yamamoto et al. | 556/451 |
| 5,175,328 | 12/1992 | Okawa et al. | 556/451 |
| 5,194,649 | 3/1993 | Okawa | 556/451 |
| 5,270,423 | 12/1993 | Brown et al. | 528/15 |
| 5,272,243 | 12/1993 | Nakashima et al. | 528/31 |
| 5,286,766 | 2/1994 | Arai et al. | 523/213 |
| 5,359,109 | 10/1994 | Ritscher et al. | 556/434 |
| 5,378,790 | 1/1995 | Michalczyk et al. | 528/35 |
| 5,403,881 | 4/1995 | Okawa et al. | 524/261 |
| 5,416,230 | 5/1995 | Jung et al. | 556/451 |
| 5,442,083 | 8/1995 | Kobayashi | 556/434 |
| 5,446,185 | 8/1995 | Cobb et al. | 556/451 |
| 5,548,051 | 8/1996 | Michalczyk et al. | 528/15 |
| 5,557,000 | 9/1996 | Minemura | 556/434 |
| 5,567,833 | 10/1996 | Iwahara et al. | 556/434 |
| 5,581,008 | 12/1996 | Kobayashi | 556/434 |
| 5,639,845 | 6/1997 | Inomata et al. | 528/15 |
| 5,670,686 | 9/1997 | Cobb et al. | 556/445 |
| 5,733,996 | 3/1998 | De Buyl et al. | 528/17 |
| 5,840,794 | 11/1998 | Palmer | 524/425 |

FOREIGN PATENT DOCUMENTS 0 803 541 A1  10/1997  European Pat. Off. ........ C08L 83/04

*Primary Examiner*—Margaret G. Moore
*Assistant Examiner*—Kuo-Liang Peng
*Attorney, Agent, or Firm*—Patricia M. Scaduto

[57] ABSTRACT

A polyorganosiloxane comprising at least one organofunctional group per molecule having multiple hydrolyzable groups. The organofunctional group is described by formula $-Z_b-R^4(Z-SiR^2{}_nX_{3-n})_a$, where each $R^2$ is an independently selected monovalent hydrocarbon radical comprising 1 to about 18 carbon atoms; each Z is independently selected from the group consisting of divalent hydrocarbon radicals comprising about 2 to 18 carbon atoms and a combination of divalent hydrocarbon radicals and siloxane segments; $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds; each X is independently selected from the group consisting of halogen, alkoxy, acyloxy, and ketoximo; n is 0, 1, or 2; a is at least 2; and b is 0 or 1, provided, when b is 0, $R^4$ is bonded to the polyorganosiloxane through a siloxane bond.

27 Claims, No Drawings

POLYORGANOSILOXANES HAVING AT LEAST ONE ORGANOFUNCTIONAL GROUP WITH MULTIPLE HYDROLYZABLE GROUPS

FIELD OF THE INVENTION

A polyorganosiloxane comprising at least one organofunctional group per molecule having multiple hydrolyzable groups. The organofunctional group is described by the formula $—Z_b—R^4(Z—SiR^2{}_nX_{3-n})_a$, where each $R^2$ is independently selected from the group consisting of a hydrogen atom and monovalent hydrocarbon radicals comprising 1 to about 18 carbon atoms; each Z is independently selected from the group consisting of divalent hydrocarbon radicals comprising about 2 to 18 carbon atoms and a combination of divalent hydrocarbon radicals and siloxane segments; $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds; each X is independently selected from the group consisting of halogen, alkoxy, acyloxy, and ketoximo; n is 0, 1, or 2; a is at least 2; and b is 0 or 1, provided, when b is 0, $R^4$ is bonded to the polyorganosiloxane through a siloxane bond.

BACKGROUND OF THE INVENTION

Polyorganosiloxane compositions which cure to elastomeric materials at room temperature are well known. Such compositions can be obtained by mixing polydiorganosiloxanes having reactive or hydrolyzable groups, such as silanol or alkoxy groups, with silane crosslinking agents, for example, alkoxysilanes, acetoxysilanes, oximosilanes, or aminosilanes, and catalysts as needed. Generally, the polydiorganosiloxanes may have 1 to 3 reactive groups per chain end. Compositions comprising these ingredients can then be cured by exposure to atmospheric moisture at room temperature.

The cure rate of a particular composition is dependent on a number of factors including the type of reactive or hydrolyzable group utilized. It is known that different hydrolyzable groups have different reactivities and even the same type of hydrolyzable group can have different reactivities. For example, in the presence of moisture, a silicon-bonded acetoxy group will hydrolyze more rapidly than a silicon-bonded alkoxy group. In addition if, for example, a silicon-bonded trialkoxy group is present on a polyorganosiloxane, it is believed that each silicon-bonded alkoxy group has a different reactivity, with the alkoxy group first reacted being "most reactive." Generally, once the first alkoxy group on a silicon atom reacts it takes a longer time for the second alkoxy group on the same silicon atom to react, and even longer for the third. Therefore, it would be desirable to prepare polyorganosiloxanes comprising at least one organofunctional group per molecule having more than one "most" reactive hydrolyzable group.

The objective of the present invention is to prepare a polyorganosiloxane comprising at least one organofunctional group per molecule having multiple hydrolyzable groups.

SUMMARY OF THE INVENTION

The present invention is a polyorganosiloxane comprising at least one organofunctional group per molecule having multiple hydrolyzable groups. The organofunctional group is described by formula $$—Z_b—R^4(Z—SiR^2{}_nX_{3-n})_a$$

where each $R^2$ is independently selected from the group consisting of a hydrogen atom and monovalent hydrocarbon radicals comprising 1 to about 18 carbon atoms; each Z is independently selected from the group consisting of divalent hydrocarbon radicals comprising about 2 to 18 carbon atoms and a combination of divalent hydrocarbon radicals and siloxane segments; $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds; each X is independently selected from the group consisting of halogen, alkoxy, acyloxy, and ketoximo; n is 0, 1, or 2; a is at least 2; and b is 0 or 1, provided, when b is 0, $R^4$ is bonded to the polyorganosiloxane through a siloxane bond.

DETAILED DESCRIPTION OF THE INVENTION

The present invention is a polyorganosiloxane comprising at least one organofunctional group described by formula $$—Z_b—R^4(Z—SiR^2{}_nX_{3-n})_a \qquad (I)$$

where each $R^2$ is independently selected from the group consisting of a hydrogen atom and monovalent hydrocarbon radicals comprising 1 to about 18 carbon atoms; each Z is independently selected from the group consisting of divalent hydrocarbon radicals comprising about 2 to 18 carbon atoms and a combination of divalent hydrocarbon radicals and siloxane segments described by formula

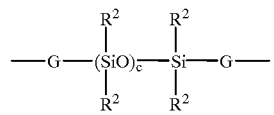

where $R^2$ is as defined above; each G is an independently selected divalent hydrocarbon radical comprising about 2 to 18 carbon atoms; and c is a whole number from 1 to about 6; $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds; each X is independently selected from the group consisting of halogen, alkoxy, acyloxy, and ketoximo; n is 0, 1, or 2; a is at least 2; and b is 0 or 1, provided, when b is 0, $R^4$ is bonded to the polyorganosiloxane through a siloxane bond.

The polyorganosiloxane of the present invention comprises at least one organofunctional group described by formula (I). The polyorganosiloxane may be linear or branched and may be a homopolymer, copolymer, or terpolymer. The polyorganosiloxane may be a single species or a mixture of different polymers.

The repeating units of the polyorganosiloxane includes siloxy units such as described by formula $R^3{}_sSiO_{(4-s)/2}$, where s is 0, 1, or 2, and each $R^3$ is independently selected from the group consisting of a hydrogen atom, monovalent hydrocarbon radicals comprising 1 to about 18 carbon atoms and the organofunctional group described by formula (I), ie. —$Z_b$—$R^4$(Z—$SiR^2_nX_{3-n}$)$_a$, where Z, $R^4$, $R^2$, X, n, a, and b are as defined above.

Each $R^2$ of the organofunctional group described by formula (I) is independently selected from the group consisting of a hydrogen atom and monovalent hydrocarbon radicals comprising 1 to about 18 carbon atoms. The monovalent hydrocarbon radicals represented by $R^2$ may be substituted or unsubstituted. Examples of monovalent hydrocarbon radicals represented by $R^2$ include alkyl radicals such as methyl, ethyl, hexyl, 3,3,3-trifluoropropyl, chloromethyl, and octadecyl; alkenyl radicals such as vinyl, allyl, and butadienyl; cycloalkyl radicals such as cyclobutyl, cyclopentyl, and cyclohexyl; cycloalkenyl radicals such as cyclopentenyl and cyclohexenyl; aryl radicals such as phenyl and xylyl; aralkyl radicals such as benzyl; and alkaryl radicals such as tolyl. Preferably each $R^2$ is independently selected from the group consisting of a hydrogen atom and monovalent hydrocarbon radicals comprising 1 to about 8 carbon atoms. More preferably each $R^2$ is an independently selected alkyl radical. Most preferably each $R^2$ is methyl.

Each X of the organofunctional group described by formula (I) is independently selected from the group consisting of halogen, alkoxy, acyloxy, and ketoximo. The halogen atoms can be chlorine, bromine, fluorine, and iodine. Examples of alkoxy groups include methoxy, ethoxy; isopropoxy, butoxy, cyclohexoxy, phenoxy, 2-chloroethoxy, 3,3,3-trifluoropropoxy, 2-methoxyethoxy, and p-methoxyphenoxy. Examples of acyloxy groups include acetoxy, propionoxy, benzoyloxy, and cyclohexoyloxy. Examples of ketoximo groups include dimethylketoximo, methylethylketoximo, methylpropylketoximo, methylbutylketoximo, and diethylketoximo. Preferably each X is independently selected from the group consisting of alkoxy, acyloxy, and ketoximo. More preferably each X is independently selected from the group consisting of alkoxy and acyloxy with each X being an independently selected alkoxy group being most preferred.

Each Z of the organofunctional group described by formula (I) is selected from the group consisting of divalent hydrocarbon radicals comprising about 2 to 18 carbon atoms and a combination of divalent hydrocarbon radicals and siloxane segments described by formula

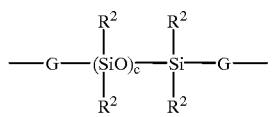

where $R^2$ is as defined above; each G is an independently selected divalent hydrocarbon radical comprising about 2 to 18 carbon atoms; and c is a whole number from 1 to about 6.

The divalent hydrocarbon radicals represented by Z and G may be substituted or unsubstituted. Examples of the divalent hydrocarbon radicals comprising about 2 to 18 carbon atoms represented by Z and G include alkylene radicals such as ethylene, methylmethylene, propylene, butylene, pentylene, hexylene, 3,3,3-trifluoropropylene and chloromethylene, and octadecylene; alkenylene radicals such as vinylene, allylene, and butadienylene; cycloalkylene radicals such as cyclobutylene, cyclopentylene, and cyclohexylene; cycloalkenylene radicals such as cyclopentenylene, and cyclohexenylene; arylene radicals such as phenylene and xylylene; aralkylene radicals as benzylene; and alkarylene radicals such as tolylene.

When Z is a combination of divalent hydrocarbon radicals and siloxane segments as described above, each G is preferably an alkylene radical, and each G is more preferably an alkylene radical comprising about 2 to 8 carbon atoms. Preferably, Z is a divalent hydrocarbon radical comprising about 2 to 18 carbon atoms. It is more preferred for Z to be an alkylene radical, with an alkylene radical comprising about 2 to 8 carbon atoms being most preferred.

Subscript n of the organofunctional group described by formula (I) is 0, 1, or 2 and is preferably 0 or 1.

Subscript a of the organofunctional group described by formula (I) is at least 2 and is preferably from 2 to about 8.

Subscript b of the organofunctional group described by formula (I) is 0 or 1, provided, when b is 0, $R^4$ is bonded to the polyorganosiloxane through a siloxane bond.

$R^4$ of the organofunctional group described by formula (I) is selected from the group consisting of a silicon atom and a siloxane radical comprising at least two silicon atoms and each Z group is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds. The siloxane radical represented by $R^4$ may have a linear, branched, resinous, or cyclic structure. In preferred embodiments, $R^4$ is selected from the group consisting of a silicon atom and a siloxane radical comprising at least two silicon atoms described by formula $$(R^2_3SiO_{1/2})_d(R^2_2SiO_{2/2})_e(R^2SiO_{3/2})_f(SiO_{4/2})_g \qquad (II)$$

where $R^2$ is as defined above and the sum of d+e+f+g is in a range from 2 to about 50, provided that at least two $R^2$ groups are replaced by Z groups of the organofunctional group as described by formula (I), ie. —$Z_b$—$R^4$(Z—$SiR^2_nX_{3-n}$)$_a$, where Z, $R^4$, $R^2$, X, n, a, and b are as defined above, since it is required that each Z group is bonded to a silicon atom of $R^4$. In more preferred embodiments, $R^4$ is selected from the group consisting of a silicon atom and a siloxane radical comprising at least two silicon atoms described by formula (II) where d is an integer from 0 to 5, e is an integer from 0 to 30, f is an integer from 0 to 5, g is an integer from 0 to 5, the sum of d+e+f+g is greater than 2, and provided that at least 2 $R^2$ groups are replaced by Z groups of the organofunctional group as described by formula (I).

In addition to the organofunctional group described by formula (I), each $R^3$ of the siloxy unit of the polyorganosiloxane may also be a hydrogen atom or a monovalent hydrocarbon radical comprising 1 to 18 carbon atoms. The hydrocarbon radicals represented by $R^3$ may be substituted or unsubstituted. Examples of monovalent hydrocarbon radicals comprising 1 to about 18 carbon atoms include those described above for $R^2$.

Preferably, each $R^3$ is independently selected from the group consisting of a hydrogen atom, monovalent hydrocarbon radicals comprising 1 to about 8 carbon atoms and the organofunctional group described by formula (I), ie. —$Z_b$—$R^4$(Z—$SiR^2_nX_{3-n}$)$_a$, where Z, $R^4$, $R^2$, X, n, a, and b are as defined above. More preferably each $R^3$ is independently selected from the group consisting of alkyl radicals and the organofunctional group described by formula (I).

The preferred polyorganosiloxane comprises repeating siloxy units described by formula —$(R^3_2SiO)_h$—, where $R^3$ is as described above and at least 80 mole percent of $R^3$ are hydrocarbon radicals and h is a value such that the polyorganosiloxane has a viscosity within a range of about 0.5 to 3000 Pa-s at 25° C. $R^3$ in the more preferred polyorganosiloxane comprises at least 95 mole percent hydrocarbon radicals. Most preferably, substantially all the $R^3$'s are hydrocarbon radicals and h is within a range of about 5 to 200 Pa-s at 25° C.

The polyorganosiloxane is required to have at least one organofunctional group described by formula (I), ie. $—Z_b—R^4(Z—SiR^2_nX_{3-n})_a$, where $R^2$, $R^4$, X, Z, n, a, and b are as defined above. The organofunctional group can be bonded in a pendant position on the polyorganosiloxane chain or at the polyorganosiloxane chain end, or in the case where more than one organofunctional group is bonded to the polyorganosiloxane both pendant and terminal positions. Preferably, the organofunctional group is bonded at the polyorganosiloxane chain end. If greater than one organofunctional group is bonded to the polyorganosiloxane, it is preferable that each organofunctional group be separated by at least 200 repeating siloxy units.

Since the organofunctional groups can be bonded at various points on the polyorganosiloxane not just at the chain end, other types of groups may also be found at the polyorganosiloxane's chain end. Examples of useful groups include $—OSiR^1_3$, $—OSiR^1_2OH$, $—OSiR^1_2H$, $—OSiR_nX_{3-n}$, and $—ZSiR^2_nX_{3-n}$; where $R^2$, X, Z, and n are as described above and each $R^1$ is an independently selected hydrocarbon radical comprising 1 to about 18 hydrocarbon radicals. Examples of monovalent hydrocarbon radicals comprising 1 to about 18 carbon atoms are as described above for $R^2$. Preferably $R^1$ is a monovalent hydrocarbon radical comprising 1 to about 8 carbon atoms with a monovalent hydrocarbon radical comprising 1 to about 4 carbon atoms being most preferred. Examples of chain end groups other than the organofunctional group described by formula (I) include $—OSiMe_3$, $—OSiEt_3$, $—OSiViMe_2$, $—OSiMeViPh$, $—OSi(Me_2)OH$, $—OSi(Me_2)H$, $—OSi(Me_2)OH$, $—OSi(OMe)_3$ and $CH_2CH_2Si(OMe)_3$, where Me is methyl, Vi is vinyl, and Ph is phenyl.

Examples of more preferred organofunctional groups useful in the present invention are selected from the group consisting of

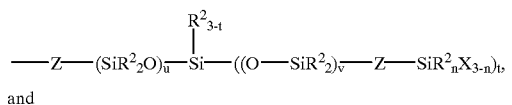

and

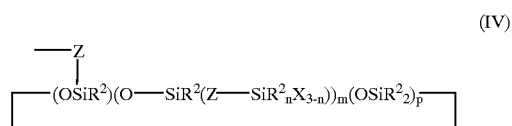

In formula (III), subscript u is an integer from 0 to 5. Preferably, subscript u is an integer from 0 to 1.

In formula (III), subscript v is an integer from 0 to 5. Preferably, subscript v is an integer from 0 to 1.

In formula (IV), subscript m is an integer from 2 to 7. Preferably, subscript m is an integer from 2 to 4.

In formula (IV), subscript p is an integer from 0 to 6. Preferably, subscript p is an integer from 0 to 3.

In addition, in formula (IV), m+p is a whole number from 2 to 8. Preferably, m+p is a whole number from 2 to 5.

The polyorganosiloxanes comprising at least one organofunctional group described by formula (I) may be prepared, for example by mixing at least one organofunctional siloxane selected from the group consisting of

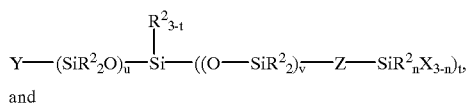

and

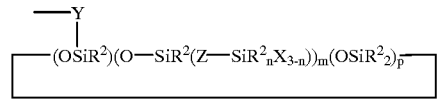

with a polyorganosiloxane comprising at least one silicon-bonded hydrogen atom or a group comprising at least one aliphatic unsaturation in the presence of a hydrosilylation catalyst, where $R^2$, X, Z, m, n, p, t, u, and v are as defined above and Y is independently selected from the group consisting of hydrogen, hydrocarbon radicals comprising one aliphatic unsaturation and about 2 to 18 carbon atoms and a combination of hydrocarbon radicals and siloxane segments described by formula

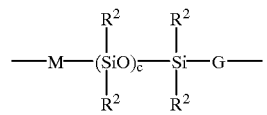

where $R^2$, G, and c are as defined above and M is selected from the group consisting of hydrocarbon radicals comprising one aliphatic unsaturation and 2 to about 18 carbon atoms.

The hydrocarbon radicals of Y and M may be substituted or unsubstituted. Examples of the hydrocarbon radicals comprising one aliphatic unsaturation of Y and M include alkenyl radicals such as vinyl, allyl, butenyl, hexenyl, and octenyl, and cycloalkenyl radicals such as cyclopentenyl, cyclohexenyl, and chlorocyclopentenyl. With non-cyclic compounds having one aliphatic unsaturation, it is preferred for the aliphatic unsaturation to be at the terminal end of the hydrocarbon radical attached to silicon, for example 1-butenyl $H_2C=CHCH_2CH_2—$.

When Y is a combination of hydrocarbon radicals and siloxane segments as described above, it is preferred that G be an alkylene radical and M an alkenyl radical, and more preferable that G be an alkylene radical comprising about 2 to 8 carbon atoms and M an alkenyl radical comprising 2 to about 8 carbon atoms. Preferably, Y is selected from the group consisting of hydrogen and a hydrocarbon radical having one aliphatic unsaturation. More preferably, Y is selected from the group consisting of hydrogen and an alkenyl radical, with hydrogen and an alkenyl radical comprising about 2 to 8 carbon atoms being most preferred.

Persons skilled in the art understand that when Y of the organofunctional group is hydrogen then the polyorganosiloxane must contain at least one aliphatic unsaturation, and similarly when Y of the organofunctional group is a group comprising one aliphatic unsaturation then the polyorganosiloxane must contain at least one silicon-bonded hydrogen atom.

The organofunctional siloxanes described by formulas (V) and (VI) may be prepared by known methods such as taught in Krahnke, et al. U.S. patent application Ser. No.

09/218,365 Krahnke, et al. "A Cyclic Organosilicon Endcapper Having One Silicon-Bonded Hydrogen Atom," Atty Docket No. DC4716; Krahnke, et al. U.S. patent application Ser. No. 09/218,365 Krahnke, et al. U.S. patent application Ser. No. 217,476 each filed concurrently herewith and hereby incorporated by reference. The polyorganosiloxane comprising at least one silicon-bonded hydrogen atom or at least one aliphatic unsaturation may also be prepared by known methods.

Catalysts typically employed for hydrosilylation reactions, such as platinum group metal-containing catalysts are used as catalysts for the reaction between the organofunctional siloxanes described by Formulas (V) and (VI) and the polyorganosiloxane comprising at least one silicon-bonded hydrogen or at least one group comprising one aliphatic unsaturation. By "platinum group metal" it is meant ruthenium, rhodium, palladium, osmium, iridium, and platinum. Platinum group metal-containing catalysts particularly useful in the present composition are the platinum complexes prepared as described by Willing, U.S. Pat. No. 3,419,593, and Brown et al, U.S. Pat. No. 5,175,325, each of which is hereby incorporated by reference to show such complexes and their preparation. Preferred catalysts are complexes of platinum with vinylsiloxane. Other examples of useful platinum group metal-containing catalysts can be found in Lee et al., U.S. Pat. No. 3,989,668; Chang et al., U.S. Pat. No. 5,036,117; Ashby, U.S. Pat. No. 3,159,601; Lamoreaux, U.S. Pat. No 3,220,972; Chalk et al., U.S. Pat. No. 3,296,291; Modic, U.S. Pat. No. 3,516,946; Karstedt, U.S. Pat. No. 3,814,730; and Chandra et al., U.S. Pat. No. 3,928,629 all of which are hereby incorporated by reference to show useful platinum group metal-containing catalysts and methods for their preparation.

The amount of catalyst useful in effecting the hydrosilylation reaction to make the composition of the present invention is not narrowly limited as long as there is a sufficient amount present to accelerate a reaction between the hydrosilyl groups and the groups comprising one aliphatic unsaturation. The appropriate amount of the catalyst will depend upon the particular catalyst used. In general as low as about 0.1 part by weight of platinum group metal based on 1 million parts by weight of total reactants may be useful (ie. 0.1 ppm). Preferably the amount of platinum group metal is from about 0.5 to 10 ppm. More preferred is from about 1 to 5 ppm platinum group metal.

The platinum group metal-containing catalyst may be added as a single species or as a mixture of two or more different species. Adding the catalyst as a single species is preferred.

The temperature of the hydrosilylation reaction is not strictly specified, but usually falls within the range of about 20° to 150° C. and preferably within the range of 20 about 30° to 110° C.

The molar ratio of reactive sites on the polyorganosiloxane relative to the reactive sites on the organofunctional siloxane needed to prepare the polyorganosiloxane of the present invention will be determined by the amount of organofunctional groups desired on the polyorganosiloxane but sufficient amounts must be used so that each polyorganosiloxane molecule comprises at least one organofunctional group. A preferable ratio is 1:1 to 1.5:1. As used herein "reactive sites" means either aliphatic unsaturated groups or silicon-bonded hydrogen groups, each type can be on either the polyorganosiloxane or organofunctional siloxane but one type must be on each of them.

The polyorganosiloxanes comprising at least one organofunctional group per molecule described by formula (I) are useful in the preparation of sealants, adhesives and coatings.

EXAMPLES

This invention is further illustrated by the following examples which are presented for that purpose and are not intended to limit the scope of the claims herein. As used in the examples, Me is methyl and Pr is n-propyl. Viscosities were measured at 25° C. using a Brookfield rheometer.

Example 1

(a) Preparation of Endcapper A.

203 g (0.686 mol) tris(dimethylsiloxy)-n-propylsilane prepared as described in U.S. Pat. No. 5,446,185 and 1.8 g of a solution of a platinum vinylsiloxane complex containing 31 ppm platinum metal were heated to 100° C. The heat was then removed and 150 g (1.01 mol) of vinyltrimethoxysilane were added dropwise over a period of about 45 min. with sufficient stirring to maintain a pot temperature of approximately 103–105° C. Analysis of the reaction mixture by gas liquid chromatography (Hewlett Packard 5890 Series II) showed a yield of approximately 40% of an organosilicon compound comprising one silicon-bonded hydrogen atom ("Endcapper A"). The reaction mixture was distilled to yield 141 g of Endcapper A having the following formula and boiling at 155° C. under 0.5 mm Hg pressure.

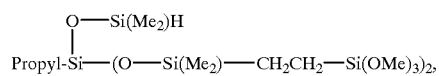

(b) Preparation of Polydimethylsiloxane Endblocked with Endcapper A.

400 g of vinyl endblocked polydimethylsiloxanes ("PDMS") having a viscosity of about 65 Pa-s and containing 0.012 mol vinyl and 294 ppm of a solution of a platinum vinylsiloxane complex containing 1.8 ppm platinum metal were mixed for several minutes at 50° C. The heat was removed and 7.72 g (containing 0.012 mol hydrogen) of Endcapper A prepared as described in Example 1 (a) was then added and mixing continued for 1 hour. The mixture was de-aired under approximately 50 mm Hg vacuum and allowed to react overnight. The vinyl on the PDMS reacted with the SiH on the endcapper and no residual vinyl was found upon testing by FT-IR (Perkin Elmer 1600 Series). Polydimethylsiloxanes endblocked with Endcapper A and having an overall viscosity of approximately 65 Pa-s were formed having the formula:

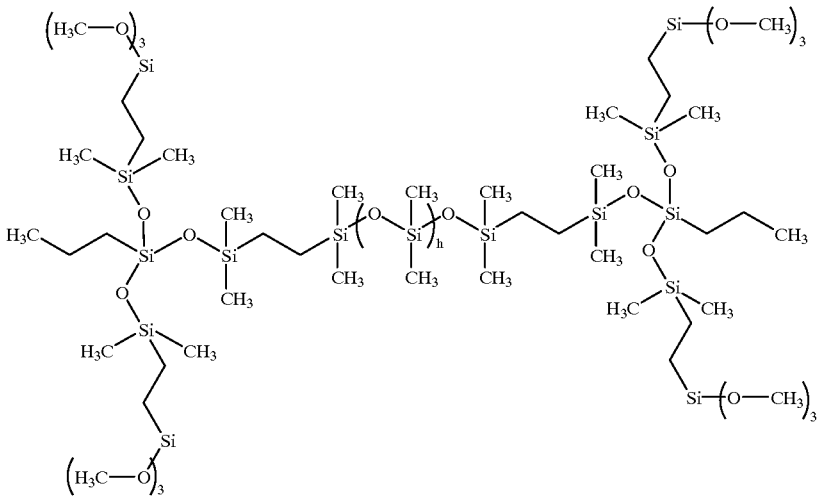

where h is an average value such that the overall viscosity was approximately 65 Pa-s.

Example 2

(a) Preparation of Endcapper B.

48.1 g (0.2 mol) 1,3,5,7-tetramethylcyclosiloxane (methyl-hydrogen cyclic) and 5000 ppm of a solution of a platinum vinylsiloxane complex containing 30 ppm platinum metal were heated to 100° C. The heat was then removed and 88.9 g (0.6 mol) of vinyltrimethoxysilane were added dropwise over a period of about 45 min. with sufficient stirring to maintain a pot temperature of approximately 100–120° C. Analysis of the reaction mixture by gas liquid chromatography (Hewlett Packard 5890 Series II) showed a yield of approximately 45% of a cyclic organosilicon compound comprising one silicon-bonded hydrogen atom ("Endcapper B"). 17 g of the reaction mixture containing about a 70% pure sample of Endcapper B having the following formula was isolated by distilling at 180° C. under 3.5 mm Hg pressure:

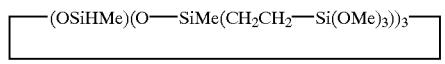

(b) Preparation of Polydimethylsiloxane Endblocked with Endcapper B.

100 g of vinyl endblocked polydimethylsiloxanes (PDMS) having a viscosity of about 65 Pa-s and containing 0.003 mol vinyl and 294 ppm of a solution of a platinum vinylsiloxane complex containing 1.8 ppm platinum metal were mixed for several minutes at 50°20 C. The heat was removed and 2.75 g of the 70% pure Endcapper B (containing at least 0.003 mol hydrogen) prepared as described in Example 2(a) was then added and mixing continued for 1 hour. The mixture was de-aired under approximately 50 mm Hg vacuum and allowed to react overnight. The vinyl on the PDMS reacted with the SiH present and no residual vinyl was found upon testing by FT-IR (Perkin Elmer 1600 Series). A mixture of polydimethylsiloxanes having an overall viscosity of approximately 170 Pa-s was formed, primarily comprising polydimethylsiloxanes endblocked with Endcapper B having the formula:

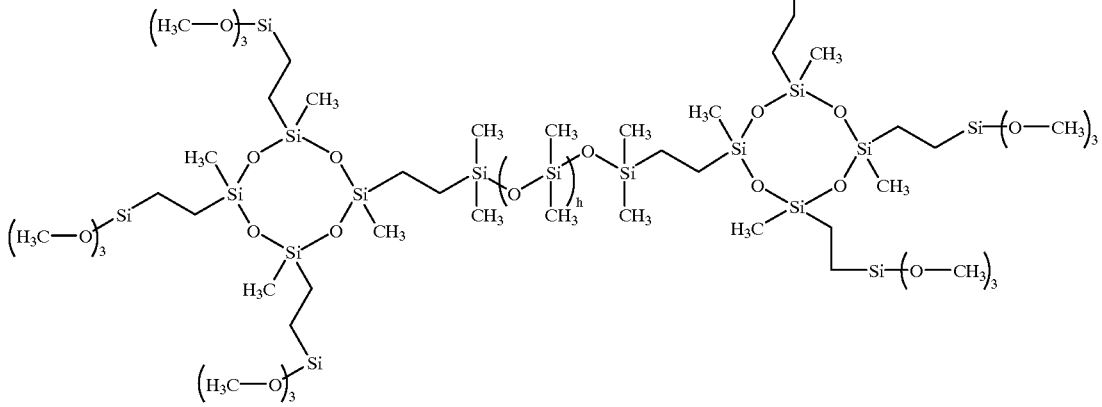

We claim:

1. A polyorganosiloxane comprising at least one organofunctional group described by the formula $$-Z_b-R^4(Z-SiR^2_nX_{3-n})_a \qquad (I)$$

where
- each $R^2$ is independently selected from the group consisting of a hydrogen atom and monovalent hydrocarbon radicals comprising 1 to about 18 carbon atoms;
- each Z is independently selected from the group consisting of divalent hydrocarbon radicals comprising about 2 to 18 carbon atoms and a combination of divalent hydrocarbon radicals and siloxane segments described by formula

where $R^2$ is as defined above; each G is an independently selected divalent hydrocarbon radical comprising about 2 to 18 carbon atoms; and c is a whole number from 1 to about 6;
- $R^4$ is independently selected from the group consisting of a silicon atom and a siloxane radical comprising at least two silicon atoms and each Z is bonded to a silicon atom of $R^4$ with the remaining valences of the silicon atoms of $R^4$ being bonded to a hydrogen atom, a monovalent hydrocarbon radical comprising 1 to about 18 carbon atoms, or forming siloxane bonds;
- each X is independently selected from the group consisting of halogen, alkoxy, acyloxy, and ketoximo;
- n is 0, 1, or 2;
- a is at least 2; and
- b is 0 or 1, provided, when b is 0, $R^4$ is bonded to the polyorganosiloxane through a siloxane bond.

2. The polyorganosiloxane of claim 1, where the polyorganosiloxane comprises repeating siloxy units described by formula $R^3_sSiO_{(4-s)/2}$, where each $R^3$ is independently selected from the group consisting of a hydrogen atom, monovalent hydrocarbon radicals comprising 1 to about 18 carbon atoms and the organofunctional group described by $Z_b-R^4(Z-SiR^2_nX_{3-n})_a$, and s is 0, 1, or 2.

3. The polyorganosiloxane of claim 1, where the polyorganosiloxane comprises repeating siloxy units described by formula $-(R^3_2SiO)_h-$, where each $R^3$ is independently selected from the group consisting of a hydrogen atom, monovalent hydrocarbon radicals comprising 1 to about 8 carbon atoms and the organofunctional group described by $-Z_b-R^4(Z-SiR^2_nX_{3-n})_a$, and h is a value such that the polyorganosiloxane has a viscosity within a range of about 0.5 to 3000 Pa-s at 25° C.

4. The polyorganosiloxane of claim 1, where the polyorganosiloxane comprises repeating siloxy units described by formula $-(R^3_2SiO)_h-$, where each $R^3$ is independently selected from the group consisting of a hydrogen atom, monovalent hydrocarbon radicals comprising 1 to about 8 carbon atoms and the organofunctional group described by $-Z_b-R^4(Z-SiR^2_nX_{3-n})_a$ and at least 80 mole percent of $R^3$ are monovalent hydrocarbon radicals, and h is a value such that the polyorganosiloxane has a viscosity within a range of about 0.5 to 3000 Pa-s at 25OC.

5. The polyorganosiloxane of claim 1, where the polyorganosiloxane comprises repeating siloxy units described by formula $-(R^3_2SiO)_h-$, where each $R^3$ is independently selected from the group consisting of alkyl radicals comprising 1 to about 8 carbon atoms and the organofunctional group described by $-Z_b-R^4(Z-SiR^2_nX_{3-n})_a$ and at least 95 mole percent of $R^3$ are hydrocarbon radicals, and h is a value such that the polyorganosiloxane has a viscosity within a range of about 5 to 200 Pa-s at 25° C.

6. The polyorganosiloxane of claim 1, where the organofunctional group is selected from the group consisting of

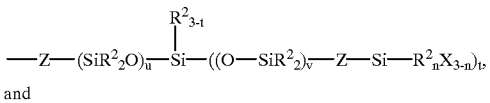

and

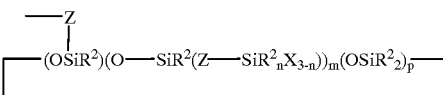

where m is an integer from 2 to 7; p is an integer from 0 to 6; m+p is an integer from 2 to 8; t is 2 or 3; u is an integer from 0 to 5; and v is an integer from 0 to 5.

7. The polyorganosiloxane of claim 3, where the organofunctional group is selected from the group consisting of

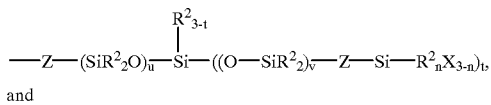
and
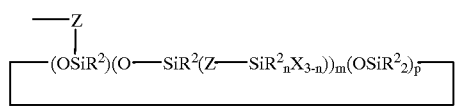

where m is an integer from 2 to 7; p is an integer from 0 to 6; m+p is an integer from 2 to 8; t is 2 or 3; u is an integer from 0 to 5; and v is an integer from 0 to 5.

8. The polyorganosiloxane of claim 4, where the organofunctional group is selected from the group consisting of

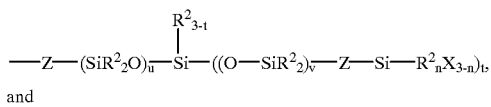
and
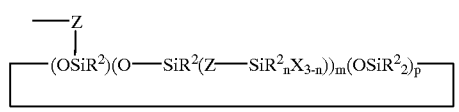

where m is an integer from 2 to 7; p is an integer from 0 to 6; m+p is an integer from 2 to 8; t is 2 or 3; u is an integer from 0 to 5; and v is an integer from 0 to 5.

9. The polyorganosiloxane of claim 1, where Z is a divalent hydrocarbon radical comprising about 2 to 18 carbon atoms.

10. The polyorganosiloxane of claim 3, where Z is an alkylene radical comprising about 2 to 18 carbon atoms.

11. The polyorganosiloxane of claim 7, where Z is a divalent hydrocarbon radical comprising about 2 to 18 carbon atoms.

12. The polyorganosiloxane of claim 8, where Z is an alkylene radical comprising about 2 to 18 carbon atoms.

13. The polyorganosiloxane of claim 1, where X is independently selected from the group consisting of alkoxy, acyloxy, and ketoximo.

14. The polyorganosiloxane of claim 9, where X is independently selected from the group consisting of alkoxy and acyloxy.

15. The polyorganosiloxane of claim 1, where X is alkoxy.

16. The polyorganosiloxane of claim 10, where X is alkoxy.

17. The polyorganosiloxane of claim 9, where the organofunctional group is described by formula

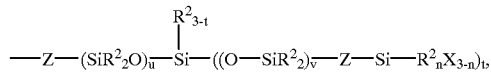

where u is an integer from 0 to 5; v is an integer from 0 to 5; and t is 2 or 3.

18. The polyorganosiloxane of claim 16, where the organofunctional group is described by formula

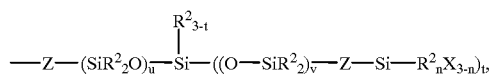

where each $R^2$ is an independently selected alkyl radical comprising 1 to about 8 carbon atoms; u is an integer from 0 to 5; v is an integer from 0 to 5; and t is 2.

19. The polyorganosiloxane of claim 9 where the organofunctional group is described by formula

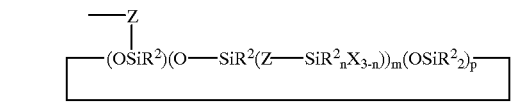

where m is an integer from 2 to 7; p is an integer from 0 to 6; and m+p is an integer from 2 to 8.

20. The polyorganosiloxane of claim 16 where the organofunctional group is described by formula

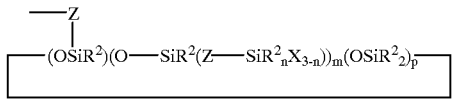

where each $R^2$ is an independently selected alkyl radical comprising 1 to about 8 carbon atoms; m is an integer from 2 to 4; p is an integer from 0 to 3; and m+p is an integer from 2 to 5.

21. The polyorganosiloxane of claim 11, where each $R^2$ is an independently selected alkyl radical comprising 1 to about 8 carbon atoms.

22. The polyorganosiloxane of claim 1, where each chain end of the polyorganosiloxane is independently selected from the group consisting of $-OSiR^1_3$, $-OSiR^1_2OH$, $-OSiR^1_2H$, $-OSiR^1_nX_{3-n}$, $-ZSiR^2_nX_{3-n}$, and $-Z_b-R^4$ $(Z-SiR^2_nX_{3-n})_a$ where each $R^1$ is an independently selected monovalent hydrocarbon radical comprising 1 to about 18 carbon atoms.

23. The polyorganosiloxane of claim 16, where each chain end of the polyorganosiloxane is independently selected from the group consisting of $-OSiR^1_3$, $-OSiR^1_2OH$, $-OSiR^1_2H$, $-OSiR^1_nX_{3-n}$, $-ZSiR^2_nX_{3-n}$, and $-Z_b-R^4$ $(Z-SiR^2_nX_{3-n})_a$ where each $R^1$ and $R^2$ is an independently selected monovalent hydrocarbon radical comprising 1 to about 8 carbon atoms.

24. The polyorganosiloxane of claim 1, where $R^4$ is selected from the group consisting of a silicon atom and a siloxane radical comprising at least two silicon atoms described by formula

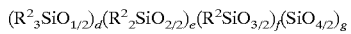

where the sum of d+e+f+g is in a range from 2 to about 50, provided that at least 2 $R^2$ groups are replaced by Z groups of the organofunctional group as described by Formula (I).

25. The polyorganosiloxane of claim 3, where $R^4$ is selected from the group consisting of a silicon atom and a siloxane radical comprising at least two silicon atoms described by formula

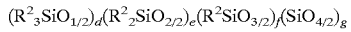

where the sum of d+e+f+g is in a range from 2 to about 50, provided that at least 2 $R^2$ groups are replaced by Z groups of the organofunctional group as described by Formula (I), and a is from 2 to about 8.

26. The polyorganosiloxane of claim 1, where $R^4$ is selected from the group consisting of a silicon atom and a siloxane radical comprising at least two silicon atoms described by formula

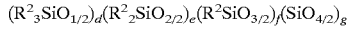

where d is an integer from 0 to 5, e is an integer from 0 to 30, f is an integer from 0 to 5, g is an integer from 0 to 5 and the sum of d+e+f+g is greater than 2, provided that at least 2 $R^2$ groups are replaced by Z groups of the organofunctional group as described by Formula (I).

27. The polyorganosiloxane of claim 3, where $R^4$ is selected from the group consisting of a silicon atom and a siloxane radical comprising at least two silicon atoms described by formula $$(R^2{}_3SiO_{1/2})_d(R^2{}_2SiO_{2/2})_e(R^2SiO_{3/2})_f(SiO_{4/2})_g$$

where d is an integer from 0 to 5, e is an integer from 0 to 30, f is an integer from 0 to 5, g is an integer from 0 to 5 and the sum of d+e+f+g is greater than 2, provided that at least 2 $R^2$ groups are replaced by Z groups of the organofunctional group as described by Formula (I), and a is from 2 to about 8.

* * * * *